US012023712B2

(12) United States Patent
Levesque et al.

(10) Patent No.: US 12,023,712 B2
(45) Date of Patent: Jul. 2, 2024

(54) APPARATUS AND METHOD FOR SEPARATING PLANTS USING AN AIR CURTAIN

(71) Applicant: Agricultural Robotics LLC, Watsonville, CA (US)

(72) Inventors: Eric J. Levesque, Klamath Falls, OR (US); Darrell Mintz, Bow, WA (US); Garrett Wallis, Cottonwood, CA (US); James A. Moshier, Visalia, CA (US)

(73) Assignee: Agricultural Robotics LLC, Watsonville, CA (US)

( * ) Notice: Subject to any disclaimer, the term of this patent is extended or adjusted under 35 U.S.C. 154(b) by 0 days.

(21) Appl. No.: 18/341,356

(22) Filed: Jun. 26, 2023

(65) Prior Publication Data

US 2024/0009706 A1 Jan. 11, 2024

Related U.S. Application Data

(60) Provisional application No. 63/367,205, filed on Jun. 28, 2022.

(51) Int. Cl.
*B07B 4/02* (2006.01)

(52) U.S. Cl.
CPC .................................... *B07B 4/02* (2013.01)

(58) Field of Classification Search
CPC .................................. B07B 4/00; B07B 4/02
USPC ...................................................... 209/139.1
See application file for complete search history.

(56) References Cited

U.S. PATENT DOCUMENTS 8,910,798 B2 * 12/2014 Benjamins ............ B07B 13/003 209/905
11,780,041 B2 * 10/2023 Emery .................... C05F 17/00 209/241
2011/0034222 A1 2/2011 Ricketts
2015/0283586 A1 * 10/2015 Dante ..................... B07C 5/366 382/110
2018/0345322 A1 * 12/2018 Skinner ...................... B07B 7/06

FOREIGN PATENT DOCUMENTS

DE 19833128 A1 * 2/1999 ............... B07B 1/12
EP 0 613 615 A1 9/1994
EP 2839735 A1 * 2/2015 ............... A01G 1/00

OTHER PUBLICATIONS

The International Search Report and the Written Opinion of the International Searching Authority for related PCT patent application PCT/US2023/069082, Dec. 4, 2023.

* cited by examiner

*Primary Examiner* — Terrell H Matthews
(74) *Attorney, Agent, or Firm* — Steven R. Vosen

(57) ABSTRACT

An apparatus and method for separating individual plants from plant and non-plant matter. In one embodiment, an air curtain is directed to a falling mixture of plant and non-plant matter. The air directs some of the plant and non-plant material into a waste or recycling bin and permits further processing of individual plants.

16 Claims, 14 Drawing Sheets

APPARATUS AND METHOD FOR SEPARATING PLANTS USING AN AIR CURTAIN

CROSS-REFERENCE TO RELATED APPLICATIONS

This application claims the benefit of U.S. Provisional Application No. 63/367,205, filed Jun. 28, 2022, the contents of which is hereby incorporated by reference in its entirety.

BACKGROUND OF THE INVENTION

Field of the Invention

The present invention generally relates to agricultural equipment, and more particularly to a method and system for separating plants having intertwined roots.

Discussion of the Background

Plants are sometimes raised at nurseries and then transplanted for growing in farms. Strawberries are an example of a crop that is raised this way. Thus, for example, a nursery cultivates parent strawberry plants, propagates runners to form daughter plants, and grows the daughter plants until they reach the right size and stage of dormancy for lifting. When the plants are in their dormant period, they are lifted (i.e., dug up), either manually or by machine, by undercutting the plants and removing them from the soil, either manually or with a machine.

When strawberry plants are lifted from the nursery fields, their roots can become tangled together. Part of the sorting process often involves carefully separating intertwined or tangled plants to prevent damage to the roots. Separating intertwined plants may be performed manually or using a machine as described for example by the "singulator" described in co-owned U.S. Pat. No. 9,358,586 (the "'586 patent), the contents of which are hereby incorporated by reference.

Lifted individual plants, including untangled plants, are then sorted and graded by size and quality, with damaged or diseased plants being discarded. Individual plants are then packed for sale, typically in bundles of 10, 25, or more.

There exists a need for a machine and method that can process large quantities of harvested plants and separate them into individual plants. Such a machine and method should be highly automated and be capable of separating the plants without damaging the roots. It would also be advantageous to be able to also eliminate plants that do not seem healthy enough to survive transplanting.

BRIEF SUMMARY OF THE INVENTION

In some aspects, the techniques described herein relate to an apparatus for sorting agricultural material, the apparatus including: a first conveyor having a head, where the first conveyor is operable to transport agricultural material in a first direction towards the head; a second conveyor having a tail positioned below the head of the first conveyor and separated from the head of the first conveyor by a gap; and an air curtain apparatus having an air discharge, where the air curtain apparatus is operable to generate an air curtain from air discharge and towards the gap, such that when the first conveyor, the second conveyor, and the air curtain apparatus are operated, the air curtain deflects at least some of the agricultural material falling across the gap away from the second conveyor.

In some aspects, the techniques described herein relate to a method for separating agricultural material, the method including: directing the agricultural material between a head of a first conveyor in a first direction to a tail of a second conveyor, where the tail of the second conveyor is spaced below the head of the first conveyor by a gap; and directing an air curtain from an air discharge towards the gap, such that the air curtain deflects at least some of the agricultural material falling across the gap away from the second conveyor.

These features together with the various ancillary provisions and features which will become apparent to those skilled in the art from the following detailed description, are attained by the apparatus of the present invention, preferred embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

DETAILED DESCRIPTION OF THE INVENTION

In certain embodiments, an apparatus is described to sort individual plants, P, from lifted agricultural material, M. In an illustrative example, which does not limit the scope of the present invention, strawberry plants are grown in a nursery to a size suitable for transplanting, at which time the plants and surrounding agricultural material are removed ("lifted") from the soil and individual plants are separated, trimmed, and packaged for delivery to a farm. In general, lifted agricultural material, M, includes individual plants, clumps of two or more strawberry plants having intertwined roots, and other material including damaged plants, dirt, rocks, etc.

Figure 1:
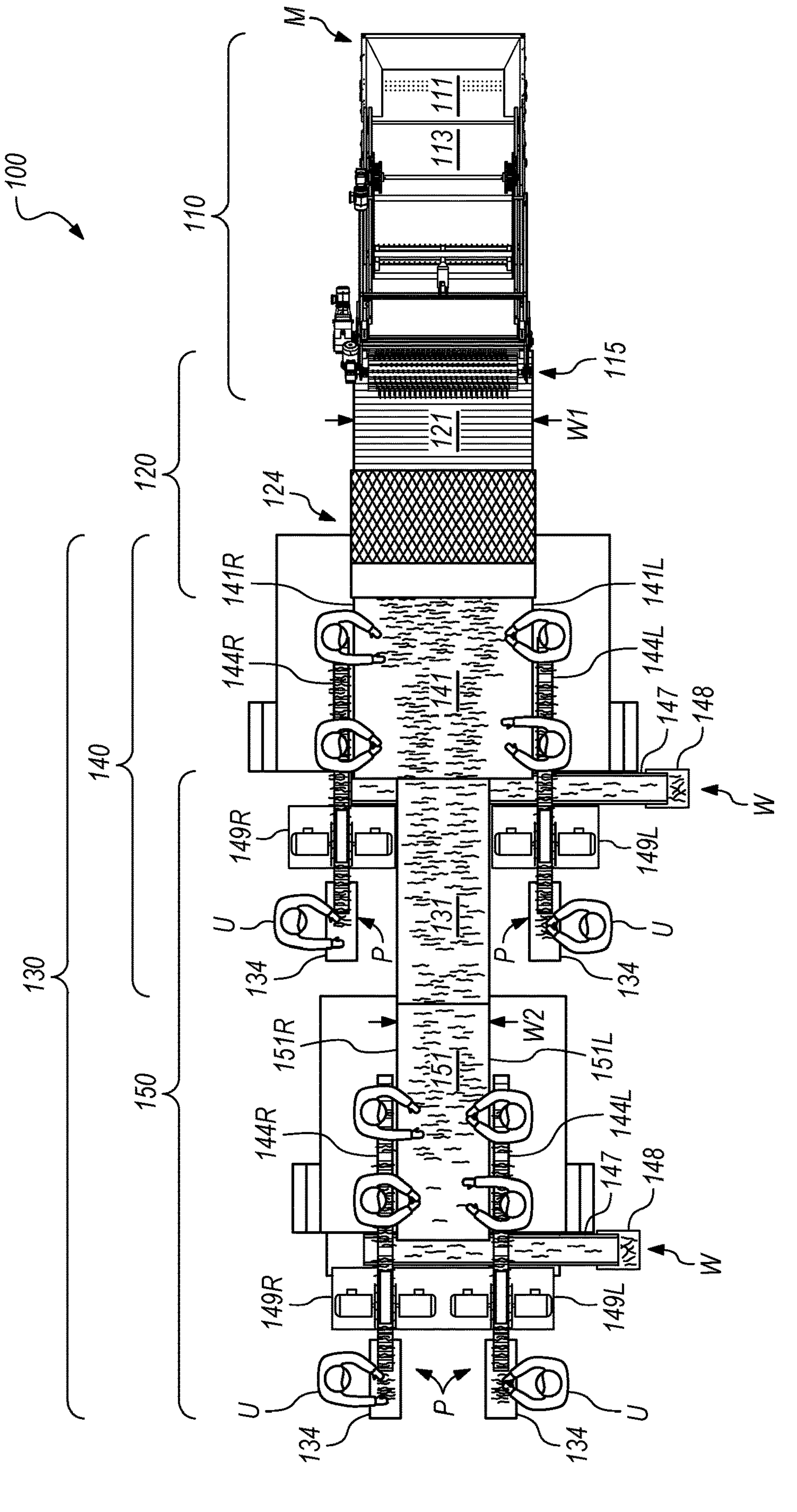
FIGS. 1 and 2 are a top view and side view, respectively, of an agricultural sorting apparatus.
Figure 2:
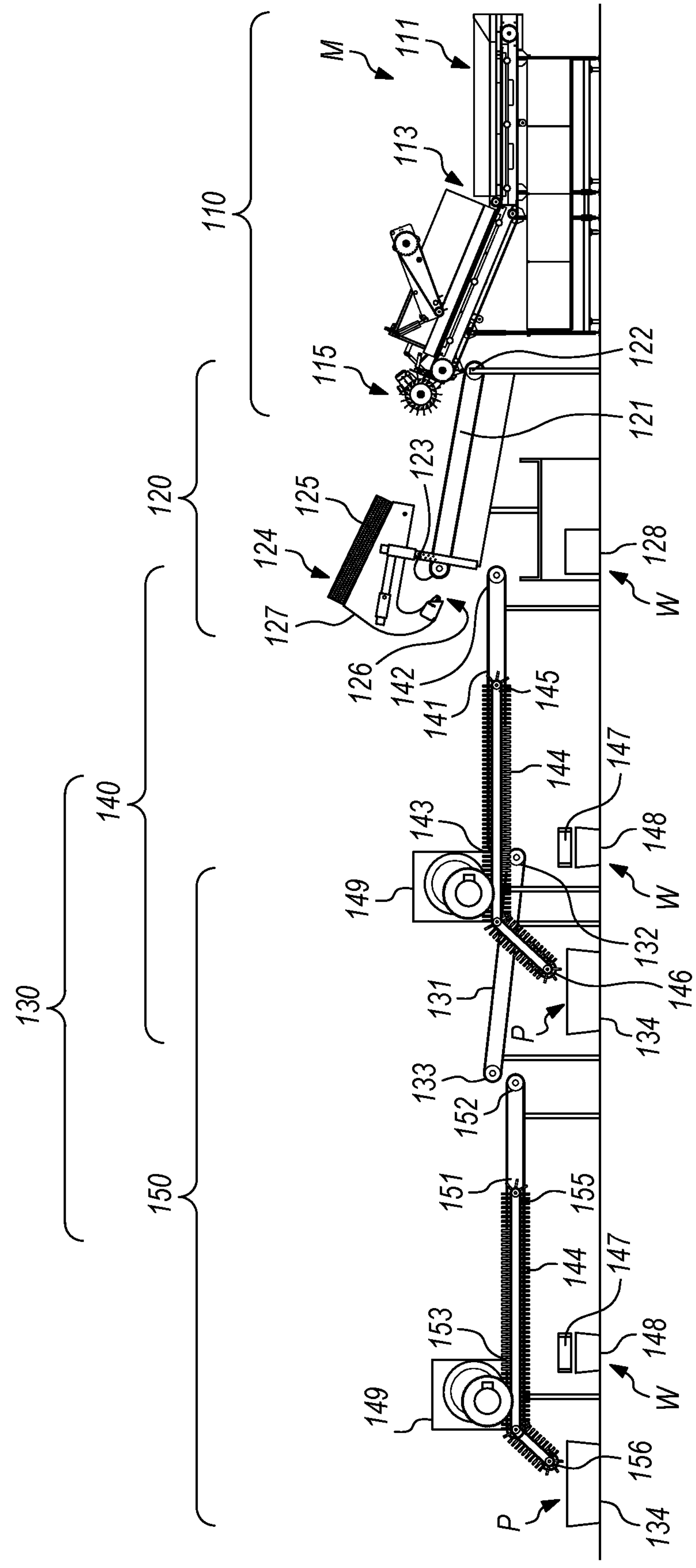

FIGS. 1 and 2 are a top view and of a side view respectively, of an apparatus 100 for sorting agricultural material into individual plants. Apparatus 100 includes, sequentially: a separating unit, or singulator 110, having an input bin 111 for accepting lifted agricultural material, M; an air curtain apparatus 120 to perform a first sorting of the lifted agricultural material; and conveyor line(s) 130 for separating individual plants, P, trimming the individual plants, packaging the trimmed individual in output bins 134. In various embodiments, conveyor line(s) 130 may be one conveyor line, or two or conveyor lines arranged in parallel or in serial. Thus, for example and without out limitation, FIGS. 1 and 2 illustrate illustrative conveyor lines 130 as including a first conveyor line 140 and a second conveyor line 150. Apparatus 100 also includes waste bins for handling rejected material from air curtain apparatus 120 and conveyor line(s) 130, as discussed subsequently.

Singulator 110 includes a conveyor 113 to transport the lifted agricultural material, M, from input bin 111 to a distal end 115, from which individual plants, P, and waste W exit the singulator. As described in co-owned U.S. Pat. No. 9,358,586 (the "'586 patent), the contents of which is hereby incorporated by reference, includes is one example of singulator 110 that the "'586 patent, includes a mechanism that separates at least some individual plants from the clumps of plants.

In certain embodiments, singulator 110 is configured to process from 300 lbs. (136 kg) to 1,500 lbs. (680 kg) of lifted agricultural material, M, has a width, W1, of approximately 5 feet (1.5 m) to 6.5 feet (2.0 m), with a velocity of conveyor 113 of from 1 in/sec (25 mm/sec) to 12 in/sec (300 mm/sec).

Material discharged from distal end 115 is provided to a conveyor tail 122 of an air curtain conveyor 121 for further processing.

Air Curtain Apparatus

Figure 3:
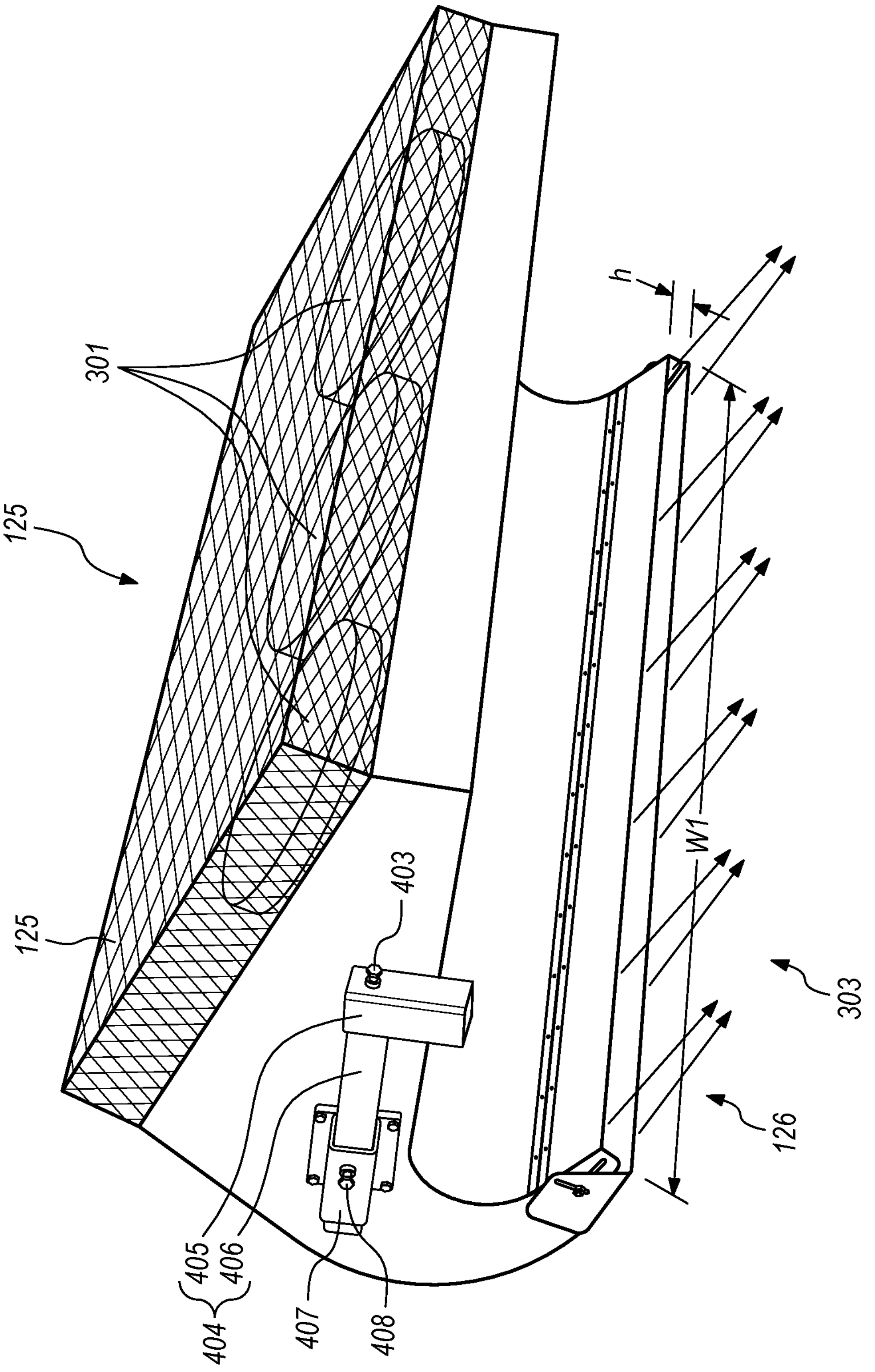
FIG. 3 is a front left perspective view of one embodiment of air curtain apparatus.
Figure 4:
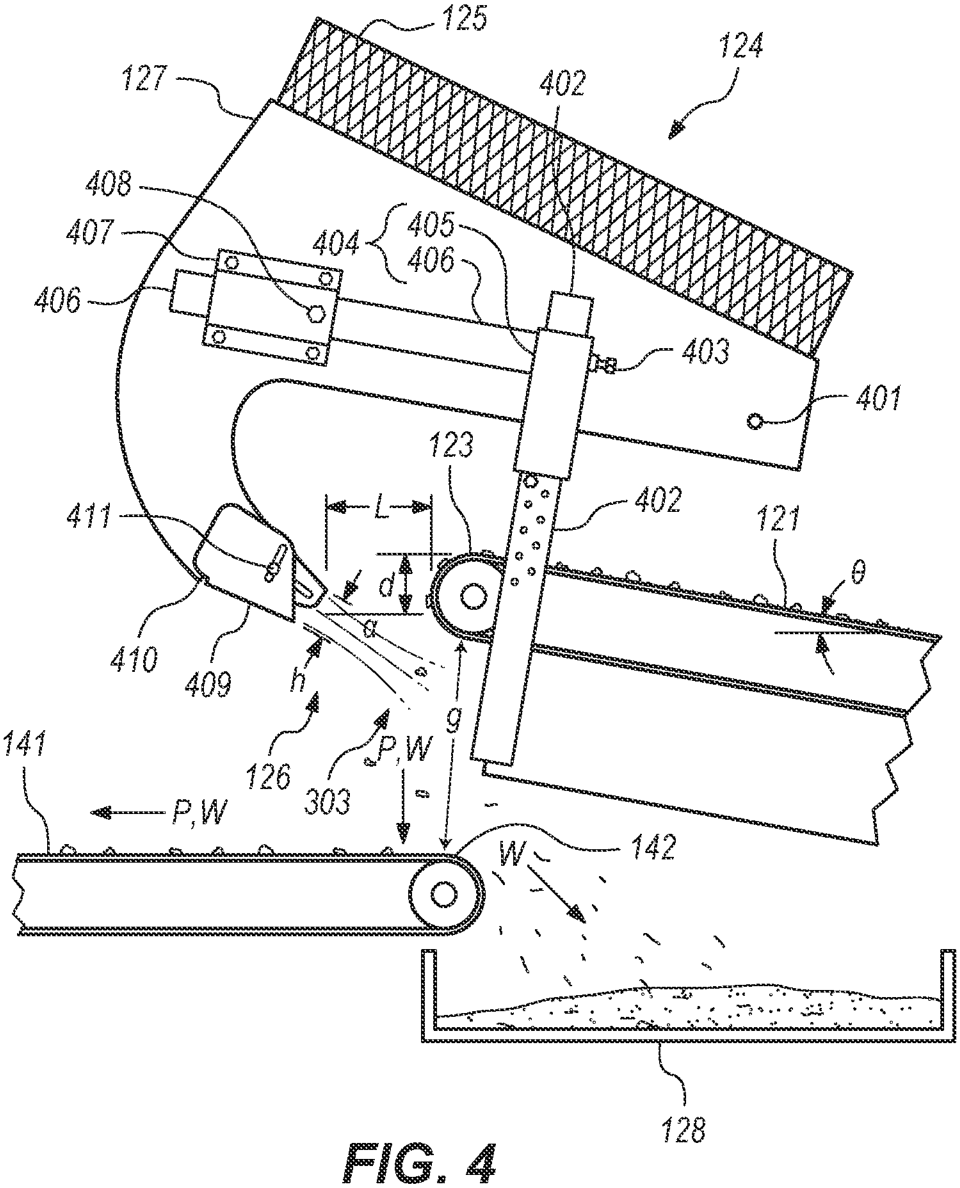
FIG. 4 is a left side view of the air curtain apparatus of FIG. 3.

FIG. 3 is a front left perspective view of one embodiment of air curtain apparatus 120 of FIGS. 1 and 2, and FIG. 4 is a left side view of the air curtain apparatus of FIG. 3. In general, a right side view of air curtain apparatus 120 is a mirror image of the view of FIG. 3. Air curtain apparatus 120 provides for a first sorting of material from singulator 110, and includes air curtain conveyor 121 having a conveyor head 123 and a mechanism to provide an air curtain 303. Conveyor line 140, as discussed subsequently, includes a first sorting conveyor 141 having a tail 142 positioned below conveyor head 123 such that material from air curtain conveyor 121 falls towards first sorting conveyor 141 while being impinged by air curtain 303.

Air curtain conveyor 121 has a length from conveyor tail 122 to conveyor head 123 of from 5.5 feet (1.7 m) to 6.5 feet (2.9 m), and forms at an upwards angle, θ, relative to the horizon, of from of +15 to +25 degrees. The angle, θ, of the moving air curtain conveyor 121 is selected to separate large objects, such as rocks, from reaching air curtain 303. With a sufficiently large angle, θ, rocks and other large objects are preferentially sorted by not being able to reach conveyor head 123.

Air curtain conveyor 121 and all of the other conveyors described herein that are used for transporting lifted agricultural material M, individual plants, P, and waste, M, may be formed from White, Food Grade, PVC type C, Multi-Ply, Friction Underside Belting, such as Grainger model 20103841-06 (W.W. Grainger, Inc., Lake Forest, IL)

The air curtain 303 is generated within an air curtain apparatus housing 124 having a mesh at an air intake 125, one or more blowers 301, and an air curtain duct 127 that directs air from the blowers to an air discharge 126. In general, adjustable settings of air curtain 303 include an air volumetric flow, Q, an average flow velocity, V, a flow direction, a, relative to the horizon, a height, h, a longitudinal separation, L, of air discharge 126 and air curtain conveyor 121, and a vertical separation, d, of air discharge 126 and air curtain conveyor 121. In general, the direction of air curtain 303 is towards the oncoming material on air curtain conveyor 121. The settings for air curtain 303, such as one or more of Q, V, α, h, L, and or V, may vary from one batch of process material to another and may also depend on the moisture content of the plant material and/or soil.

Air curtain apparatus 120 includes various mechanisms for adjusting or controlling air curtain 303 include a switch or knob 401 that is operable to control one or more blowers 301 and which thus may be used to adjust Q and/or V.

Air curtain apparatus 120 includes various mechanisms to adjust longitudinal separation, L, and vertical separation, d, of air discharge 126 including a first member 402, a first set screw 403, a second member 404 including a first portion 405 and a second portion 406, a bracket 407, and a second set screw 408. Specifically, first member 402, which may be a tube having a square or rectangular cross section, has one end fixed relative to air curtain conveyor 121 and a second end that passes through the interior of first portion 405. First set screw 403 passes through first portion 405 to first member 402, and is used to fix a location of first portion 405 on first member 402. Second portion 406, which is attached first portion 405 at a right angle, extends through bracket 407. Second set screw 408 that passes through bracket 407 to second portion 406, and is used to fix the location of bracket 407 on the second portion 406.

With first member 402 fixed relative to air curtain conveyor 121 and bracket 407 attached to air curtain duct 127, a user may thus adjust L and/or d by first set screw 403 and/or second set screw 408 and moving air curtain duct 127 relative to air curtain conveyor 121.

Air curtain duct 127 also has a duct portion 409 that is connected to the duct by a hinge 410 and includes a set screw 411 which can be used to set the height, h, which can also average flow velocity, V.

With air curtain 303 thus adjusted and blowing back towards air curtain conveyor 121, and specifically directed towards a gap between conveyor head 123 and tail 142, the air curtain impinges on falling material from air curtain conveyor 121, resulting in some of the waste, W, directed into first waste bin 128, and the remaining material, which includes individual plants, P, and the remaining waste, W, falling onto first sorting conveyor 141.

In certain embodiment, the width, W1, is the same as the width of singulator 110, the setting for separating strawberry plants may, have setting that permit, for example and without limitation, an air curtain flow volume, Q, between from 2,000 standard cubic feet per minute (57 standard cubic meters per minute) and 8,000 standard cubic feet per minute (225 standard cubic meters per minute), the air curtain flow velocity, V, is between 20 feet/min (6 m/min) and 200 feet/min (60 m/min), the air curtain flow direction, a, is between −20° and +20° relative to the horizon, the initial air curtain height, h, is between 1 inch (25 mm) and 5 inches (125 mm), the distance, L, is between 3 inches (75 mm) and 20 inches (0.5 m), and the vertical position, V, is between +15 inches (+375 mm) and −15 inches (−375 mm).

Individual Plant Conveyors

Material from air curtain apparatus 120 is provided to first conveyor line 140, which includes: a first sorting conveyor 141 having a width, W1, a left side 141L, a right side 141R, a tail 142, and a head 143; a pair of plant conveyors 144 including a left plant conveyor 144L and a right plant conveyor 144R; a pair of cutting/trim stations 149 including a left cutting/trim station 149L and a right cutting/trim station 149R; a transverse conveyor 147; and second waste bin 148. Left plant conveyor 144L is adjacent to left side 141L, right plant conveyor 144R is adjacent to right side 141R, and the left and right plant conveyors each extend from a corresponding tail 145 to a corresponding head 146. Left cutting/trim station 149L is positioned to accept left plant conveyor 144L and right cutting/trim station 149R is positioned to accept right plant conveyor 144R. First transverse conveyor 147 is positioned below head 143.

Second conveyor line 150 includes a conveyor 131 having a width, W2, that is less than W1, and other components that are generally similar to first conveyor line 140 including: a second sorting conveyor 151 having a width, W2, a left side 151L, a right side 151R, a tail 152, and a head 153; a second pair of plant conveyors 144 including left plant conveyor 144L adjacent to left side 151L and right plant conveyor 144R adjacent to right side 151R; a second pair of cutting/trim stations 149 including left cutting/trim station 149L and right cutting/trim station 149R; a second transverse conveyor 147; and a waste bin 148. Left plant conveyor 144L is adjacent to left side 151L, right plant conveyor 144R is adjacent to right side 151R, and the left and right plant conveyors each extend from corresponding tail 145 to a corresponding head 146. Left cutting/trim station 149L is positioned to accept left plant conveyor 144L and second right cutting/trim station 149R is positioned to accept right plant conveyor 144R. Second transverse conveyor 147 is positioned below head 153.

Conveyor 131 has width, W2, and has a tail 132 and a head 133, with tail 132 positioned below head 143 and with head 133 positioned above second sorting conveyor 151. Material conveyed by first sorting conveyor 141 to head 143 thus falls either onto first transverse conveyor 147 as waste provided to second waste bin 148 or onto conveyor 131 and then onto second sorting conveyor 151 for further sorting.

Second sorting conveyor 151 has a left side 151L, a right side 151R, a tail 152 and a head 153. Left plant conveyor 144L is adjacent to left side 151L, right plant conveyor 144R is adjacent to right side 151R, and the left and right trim conveyors each extend from corresponding trim conveyor tail 155 to a corresponding trim conveyor head 156. Second left cutting/trim station 149L is positioned to accept left plant conveyor 144L and first right cutting/trim station 149R is positioned to accept right plant conveyor 144R. Second transverse conveyor 147 is below head 153 and collects waste from second sorting conveyor 151.

In certain embodiments: first sorting conveyor 141 has a length from tail 142 to head 143 of from 12 feet (3.66 m) to 14 feet (4.27 m); conveyor 131 has a length from tail 132 to head 133 of from 8 feet (2.44 m) to 10 feet (3.05 m); second sorting conveyor 151 has a length from tail 152 to head 153 of from 12 feet (3.66 m) to 14 feet (4.27 m). In certain other embodiments: first sorting conveyor 141, conveyor 131, and second sorting conveyor 151 each move at the same rate of from 0.5 feet/sec (0.15 m/sec) to 5.0 feet/sec (1.5 m/sec). In certain embodiments, each of plant conveyors 144 has a length from tail 145 to head 146 of from 17 feet (5.2 m) to 19 feet (5.8 m) and they move at the same rate of from 0.5 feet/sec (0.15 m/sec) to 5.0 feet/sec (1.5 m/sec).

Figure 6:
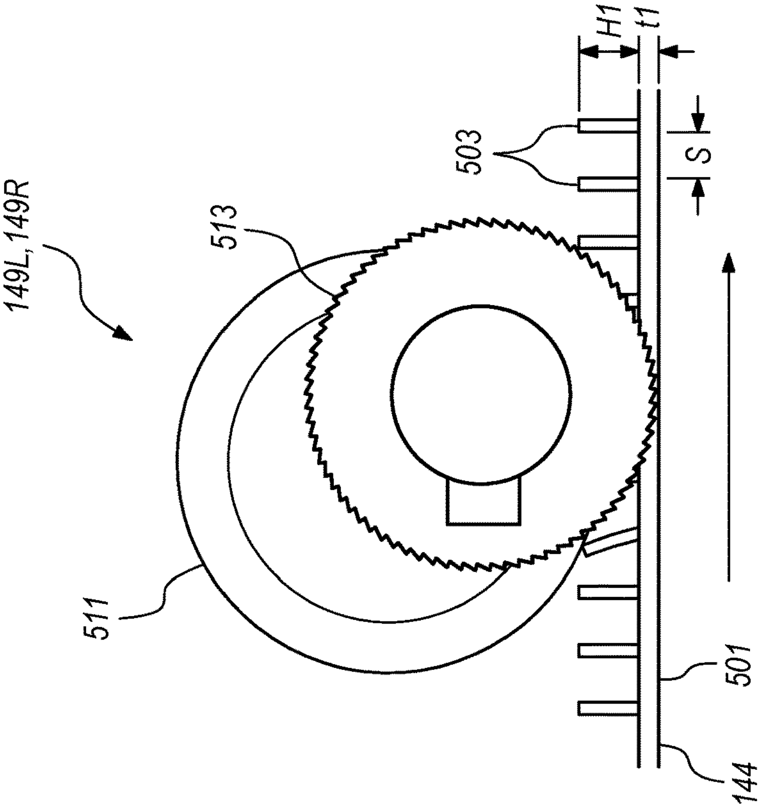
FIG. 6 is a side view of the trim station of FIG. 5.
Figure 5:
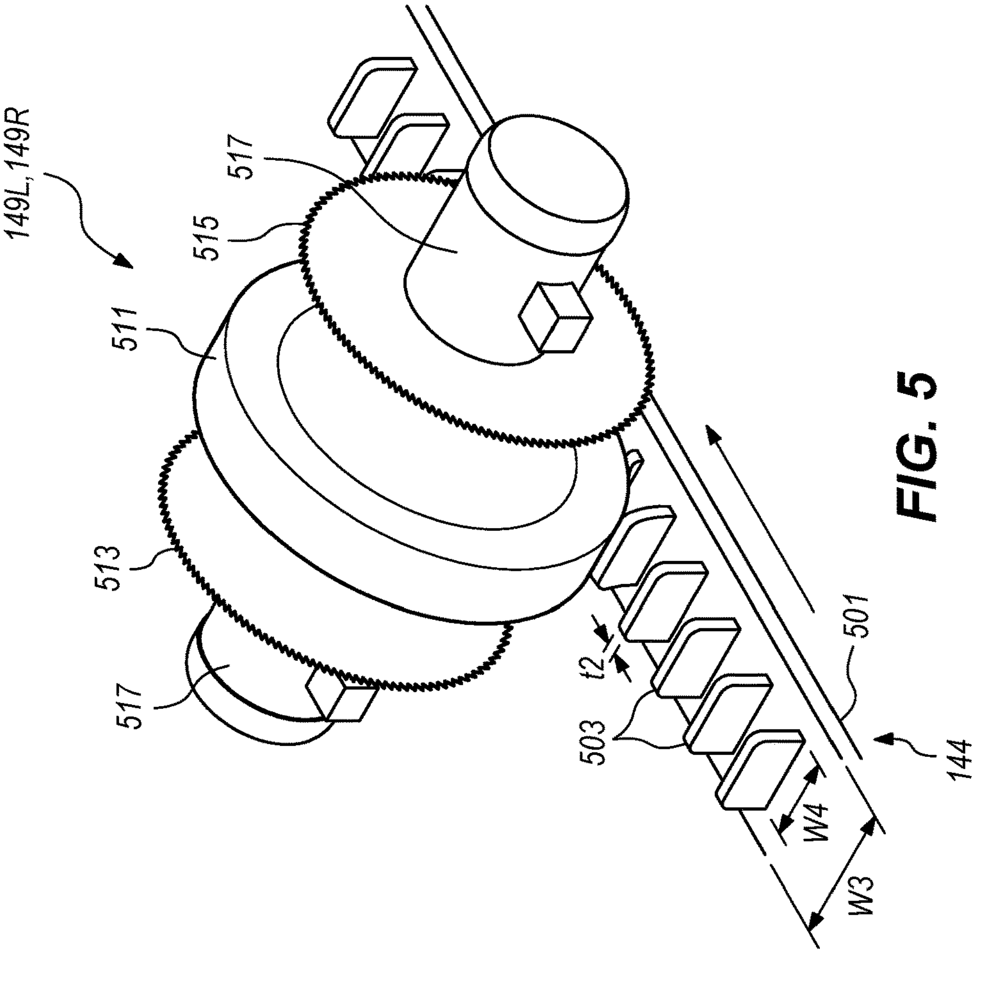
FIG. 5 is a perspective view of a trim station.

Details of each left plant conveyor 144 are illustrated in FIG. 5 as is a perspective view of a trim station 149L or 149R, and in FIG. 6 is a side view of the trim station.

Each of left plant conveyor 144L and right plant conveyor 144R include a conveyor belt 501 of thickness, t, and width, W3, with a plurality of cleats, or cleats 503 each having a height, H1, and equally spaced along conveyor belt 501 with a spacing, S.

In operation workers, indicated as users U, remove lifted agricultural material, M, from the field and place it in input bin 111 and package individual plants, P, as discussed below. Singulator 110 separates the lifted agricultural material, M, into individual plants, P, and waste, W, which may include some clumps of intertwined plants that were not separated in singulator 110. Next, the air curtain aerodynamically separates some of the waste into first waste bin 128 with the remaining material falling onto first sorting conveyor 141.

Then, other workers, indicated as users U, take up work stations at first conveyor line 140 adjacent to left plant conveyor 144L and right plant conveyor 144R. These workers manually select and remove individual plants from first sorting conveyor 141 and place them on the adjacent right plant conveyor 144R or left plant conveyor 144L and between a pair of cleats 503.

Material that was not removed by workers from head 143 either falls on to first transverse conveyor 147, where it is either treated as waste or recycled back into singulator 110 to further separate clumps of plants, or is transported onto conveyor 131 and then onto second sorting conveyor 151.

Workers at second conveyor line 150 on either side of second sorting conveyor 151 manually remove individual plants, P, from the conveyor and place them on adjacent right plant conveyor 144R or left plant conveyor 144L and between a pair of cleats 503.

In certain embodiments, individual plants, P, are aligned in plant conveyors 144 with either the roots or stems placed towards users, U.

Mechanisms for moving and controlling first conveyor line 140 and second conveyor line 150 are well-known in the field and are not repeated here. In addition, the operation of such a system to include safety features and control features are well known are not repeated here.

Plant Trim and Packaging Conveyor Line

Individual plants, P, on plant conveyors 144 then pass through trim stations 149. FIGS. 5 and 6 illustrate a representative trim station 149, which may be one of trim station 149L or trim station 149R. Specifically, left plant conveyor 144L passes through trim station 149L, and right plant conveyor 144R passes through trim station 149R. As shown in FIGS. 5 and 6, each trim station 149 includes a press wheel 511, a first saw blade 513 adjacent to an individual plant conveyor, and optionally a second saw blade 515 adjacent to an individual plant conveyor on the opposite side of first saw blade 513, and a motor 517 for each saw blade.

In general, each plant conveyor 144 includes a conveyor belt 501 of thickness, t, and a width, W3. with a cleats 503 each having a height, H1, and equally spaced along conveyor belt 501 with a spacing, S. Adjacent cleats 503 orient the plants with roots on one side, stems on the other and the crown placed for best stem cost (2" or 4", for example). Each of the cleats 503 are semirigid and are designed to keep plants oriented by their height, pitch, and length by press wheel 511 as they pass by first saw blade 513 and or second saw blade 515.

In certain embodiments, the spacing, S, between adjacent cleats 503 may hold from one plant, P, 2 plants, 3 plants, 4 plants, 5 plants, 6 plants, 7 plants, 8 plants, 9 plants, or as many as 10 individual plants. In certain embodiments the thickness, t1, is from ⅛ inch (3.2 mm) to ¼ inch (1.6 mm), the thickness, t2, is from 5⁄16 inch (8 cm) to 0.5 inch (12 mm), the width, W4, is from 4 inches (100 mm) to 7 inches (180 mm), height, H1, is from 1.2 inches (30 mm) to 4 inches (100 mm), and spacing, S, is from 1 inch (25 mm) to 3 inches (75 mm). As described subsequently, the flights are bendable and may be formed from or include, for example and without limitation, a rubber material.

As individual plant conveyors move through trim stations 149, press wheel 511 pushes down on cleats 503 holding the individual plants in place and proper orientation for trimming by first saw blade 513 and/or second saw blade 515. The spacing between first saw blade 513 and/or second saw blade 515 is selected so that a proper amount of excess material is removed from the plants, resulting in the exact amount of stem and/root material remaining on the plants for packaging.

In certain embodiments, the first saw blade 513, and second saw blade 515 are Diablo brand, 10 inch, 90 Tooth, Ultimate Polished Finish blades (Diablo Tools, High Point, NC), the motors driving each blade is a ½ horse power electric motors. Press wheel 511 is a 10 inch (0.25 m) to 12 inch (0.30 m), heavy foam rubber outer layer bonded to forged metal wheel, and operates as an idle wheel with gravity leveraged from hinged moment arm.

Figure 7:
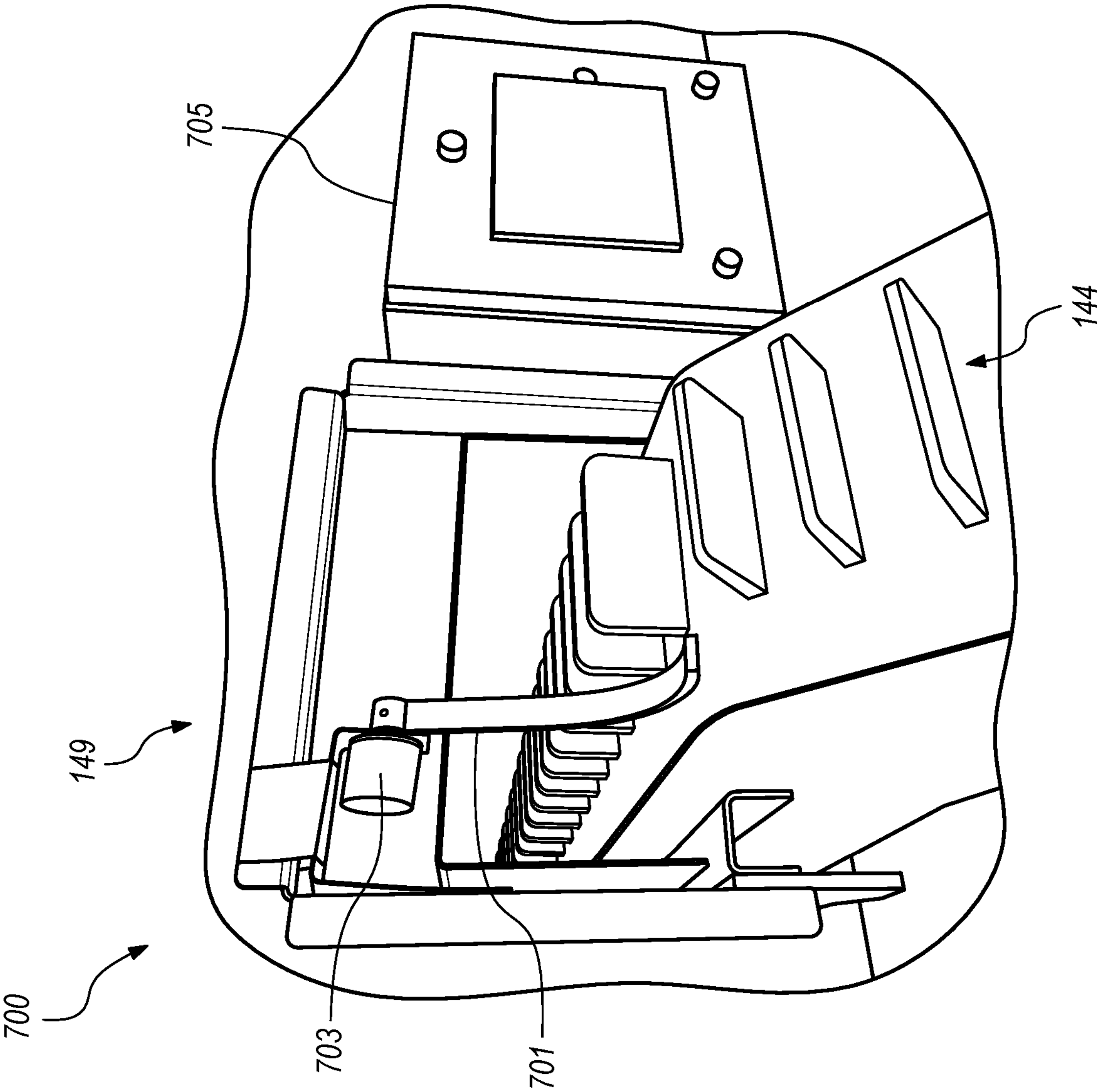
FIG. 7 is a rear view of a trim station showing a counting device.

FIG. 7 is a rear view of a trim station 149 and the respective plant conveyor 144 as it leaves the trim station, and a counting device 700 including an arm 701 having one contacting the plant conveyors and a second end rotatably attached to an encoder 703, and electronics 705. As individual plants, P, pass under arm 701, the arm rotates about encoder 703 and sends a signal to electronics 705 indicating the presents of plants. The construction and operation of counting device 700 would be obvious to one skilled in the art.

The individual plants, P, then reach the end of plant conveyor 144 and are deposited into output bins 134. In certain embodiments, a worker transfers individual plants, P, into output bins 134, and may alternate their direction to pack the plants into the output bins.

Alternative Plant Trim and Packaging Conveyor Line Embodiments

Figure 8:
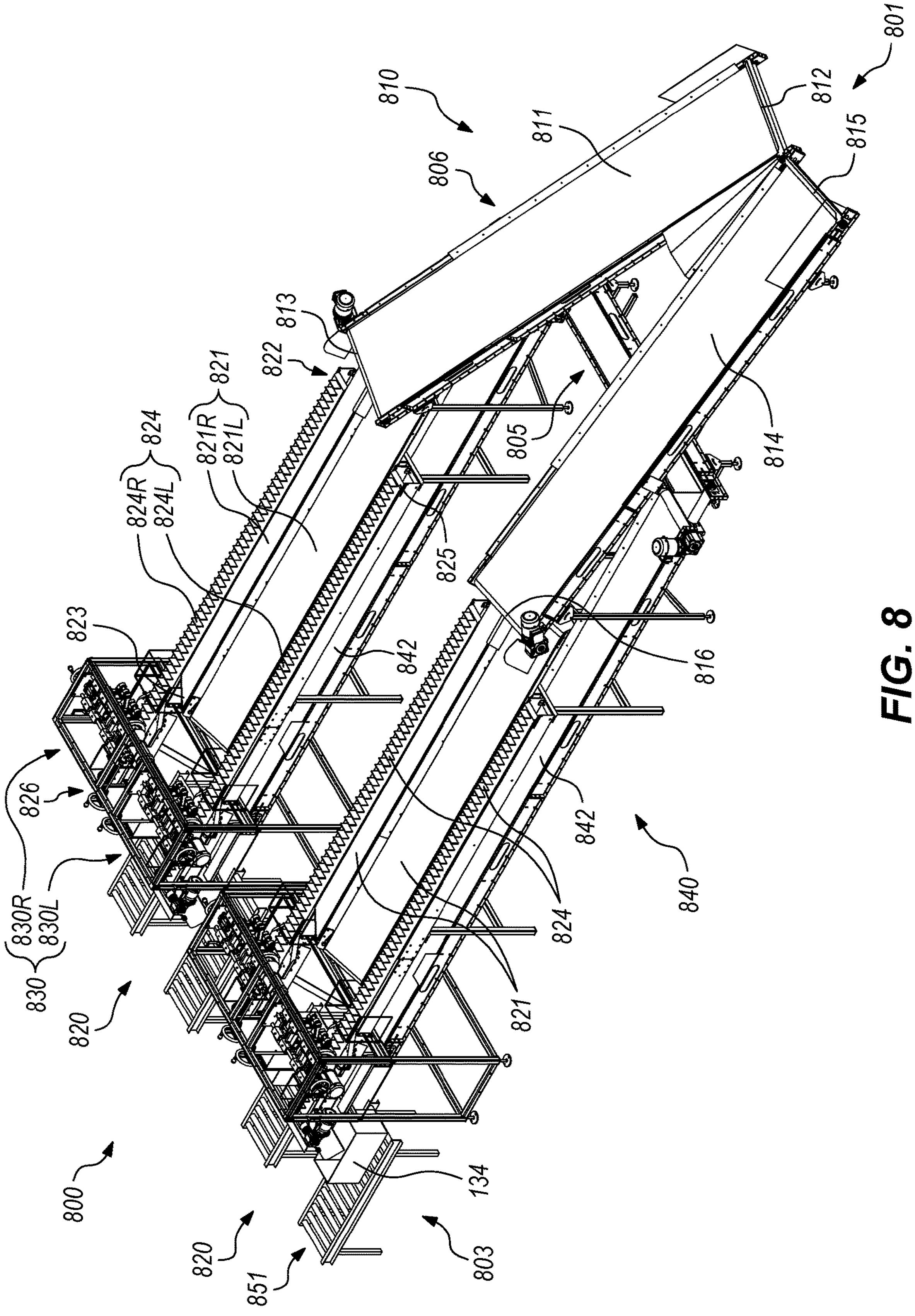
FIGS. 8, 9, and 10 are a perspective view, a top view, and a side view, respectively, of a second embodiment conveyor line.
Figure 9:
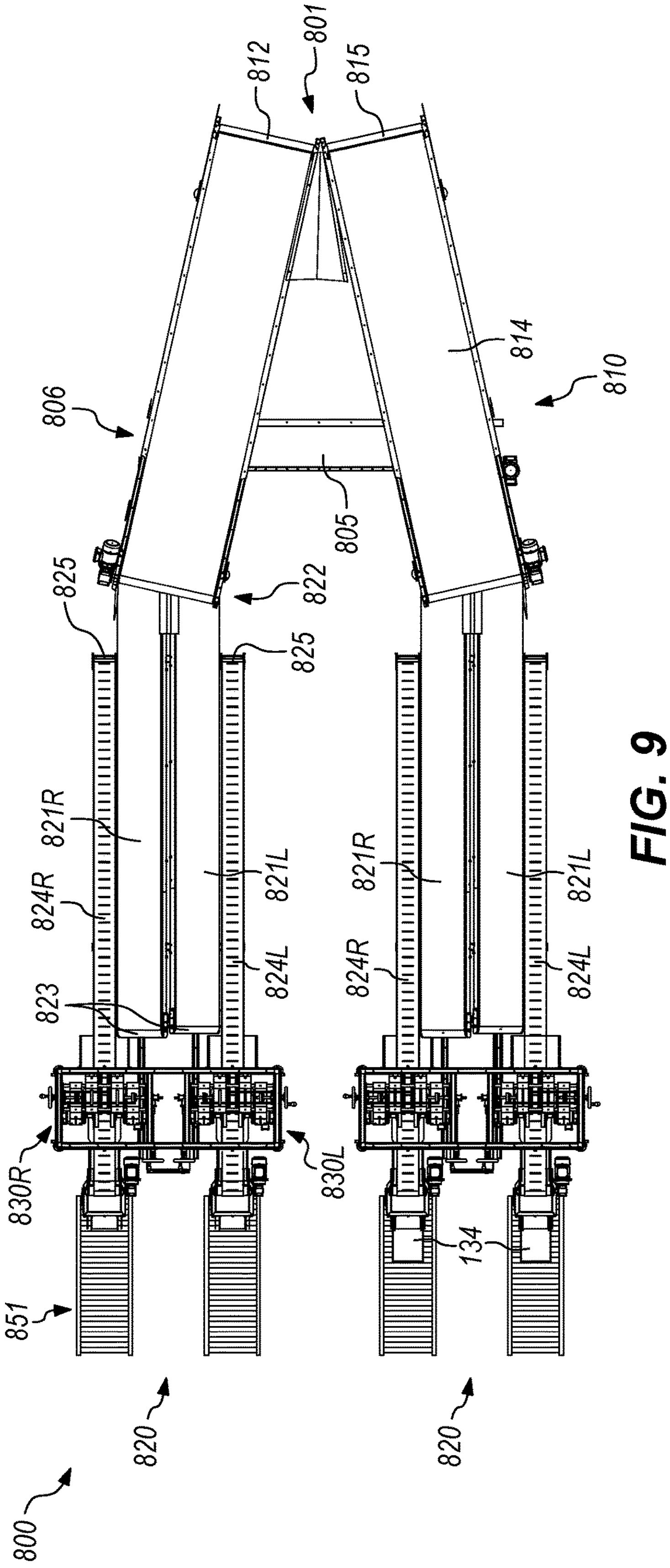
Figure 10:
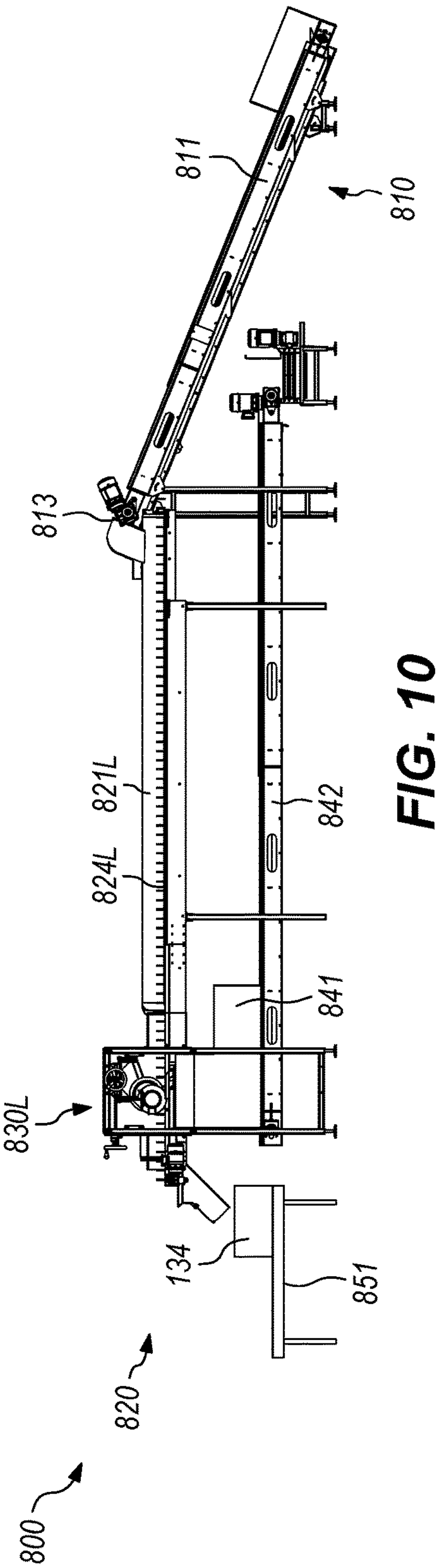

FIGS. 8, 9, and 10 are a perspective view, a top view, and a side view, respectively, of a second embodiment conveyor line 800. Second embodiment conveyor line 800 is generally similar to conveyor line(s) 130, except as explicitly stated.

Conveyor line 800 has an input end 801, a first output end 803, and a second output end 806, and includes distribution system 810 at input end 801, and two conveyor lines, each shown as conveyor line 820 at first output end 803, and a waste conveyor 805 at second output end 806.

Distribution system 810 includes a right conveyor 811 having a tail 812 and a head 813 and a left conveyor 814 having a tail 815 and a head 816. Tail 812 and tail 815 are, for example and without limitation, provided with agricultural material to be sorted. In one embodiment, right conveyor 811 and left conveyor 814 are positioned to both receive material from air curtain apparatus 120, such as by replacing first sorting conveyor 141 of FIG. 1.

Conveyor line 820 includes: a conveyor 821 having a tail 822 and a head 823 and includes a right conveyor 821R and a left conveyor 821L; a plant conveyor 824 having a tail 825 and a head 826 and includes a right plant conveyor 824R and a left plant conveyor 824L; a trim station 830 including a right trim station 830R and a left trim station 830L; waste transport system 840 including a waste deflector 841 and a conveyor 842 having a tail 843 and a head 844; and conveyors 851 for holding output bins 134.

Plant conveyor 824 is generally similar to plant conveyors 144. Right conveyor 811 and left conveyor 814 each have a length of from 10 ft (3.0 m) to 12 ft (3.7 m), an upwards angle of from 10 degrees to 30 degrees, and a speed of from 0.5 ft/sec (0.15 msec) to 5.0 ft/sec (1.5 m/sec).

Figure 11:
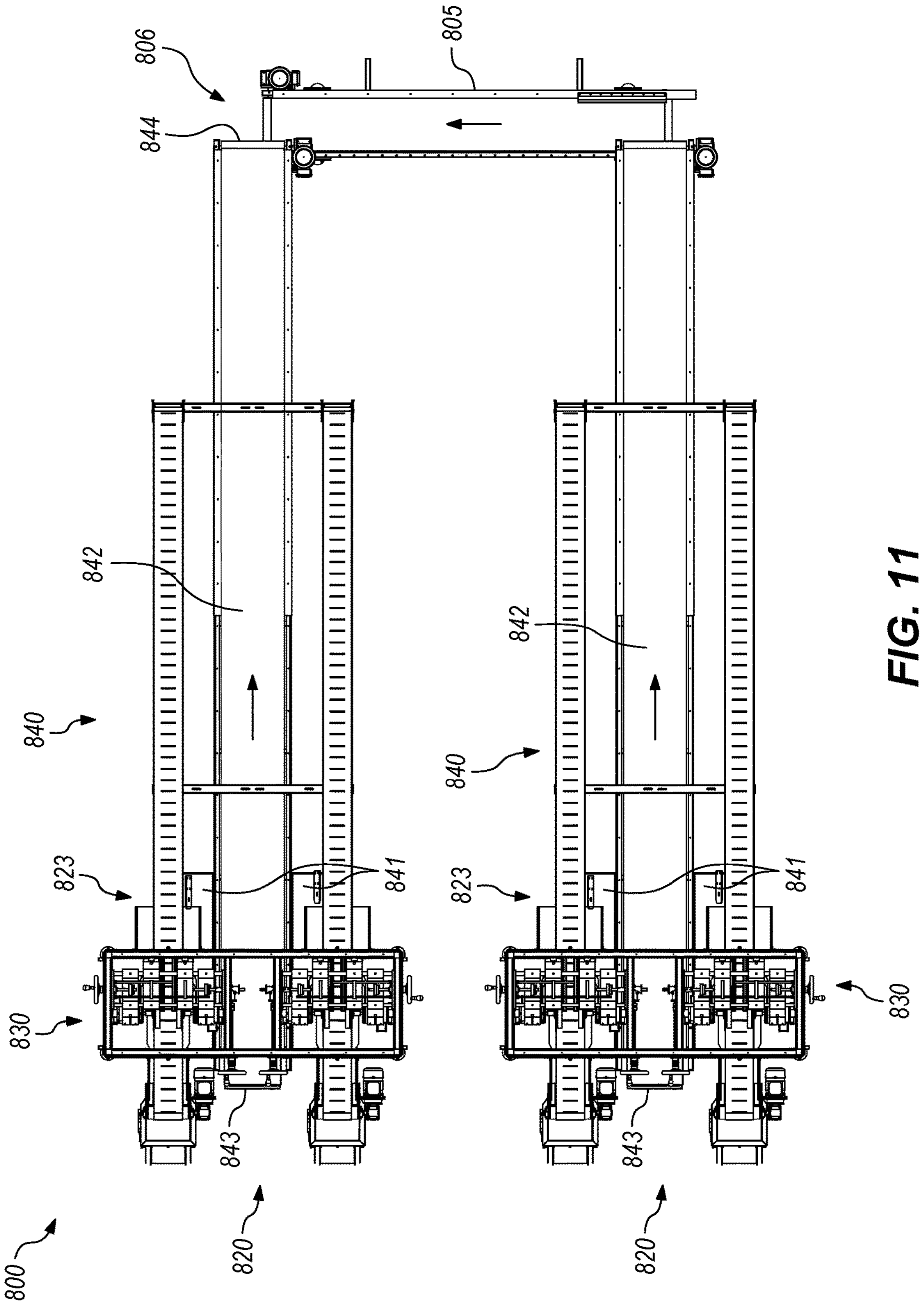
FIGS. 11 and 12 are a top view and a perspective view, respectively, highlighting the waste handling system of the conveyor line of FIG. 8.
Figure 12:
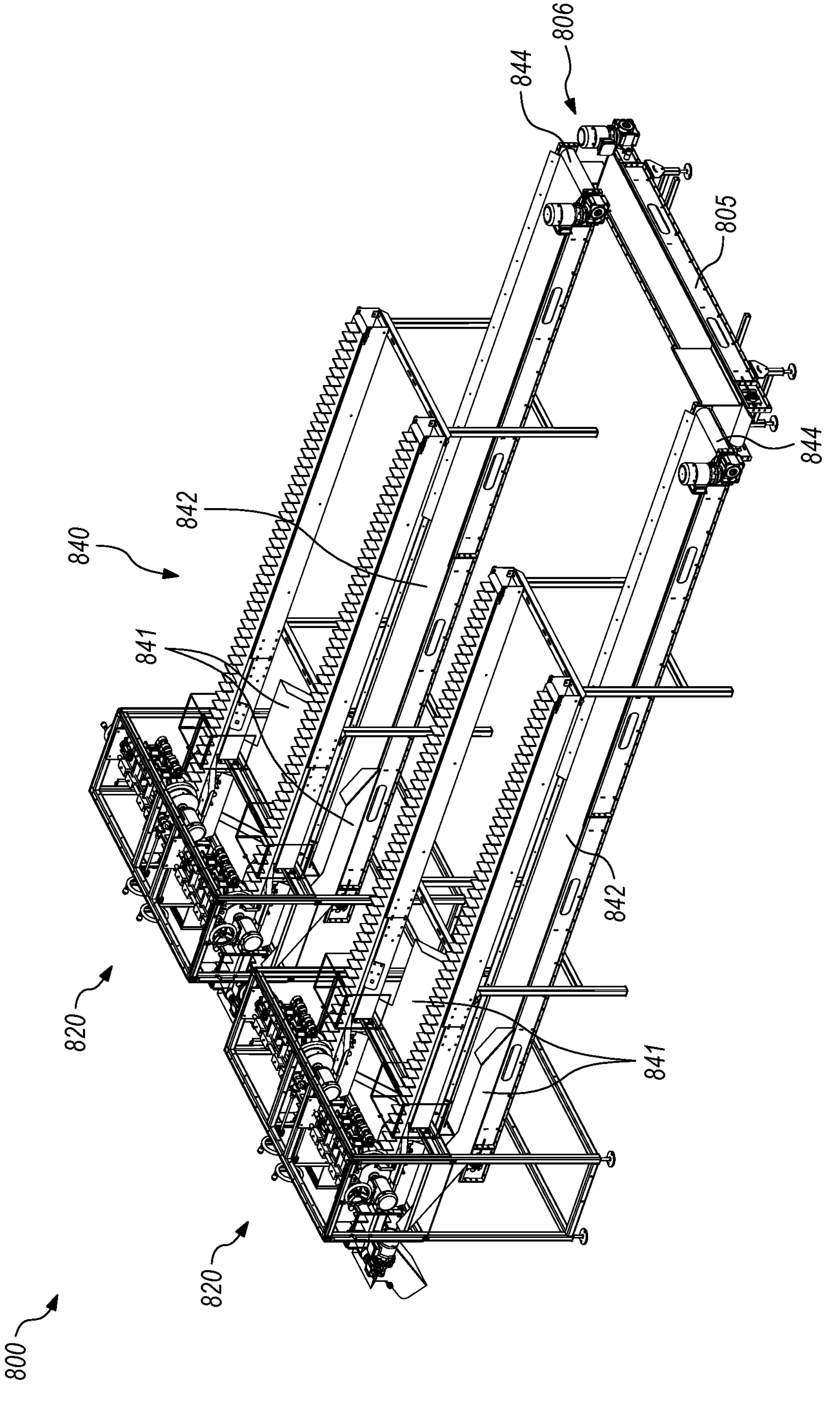

FIGS. 11 and 12 are a top view and a perspective view, respectively, highlighting the waste transport system 840. The views of FIGS. 11 and 12 are similar to those of FIGS. 8-10, where certain components have been removed to show waste transport system 840.

Waste transport system 840 includes conveyor 842 with tail 843 and waste deflector 841 positioned below trim station 830 and shaped to direct waste from the trim station to conveyor 842. Head 844 of waste transport system 840 of one of conveyor line 820 provides waste to waste conveyor 805, where it is conveyed to second output end 806, and head 844 of waste conveyor 805 located at second output end 806.

Figure 13:
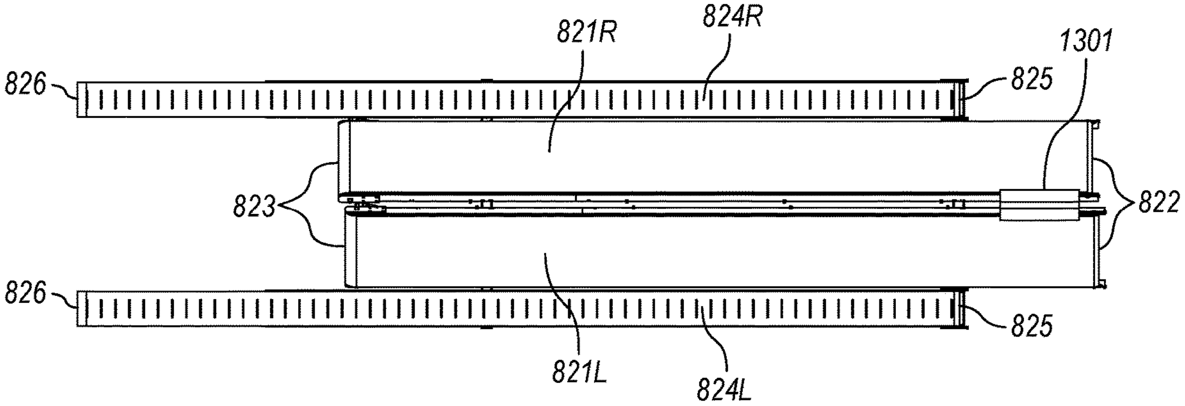
FIGS. 13 and 14 are a top view and an end view, respectively, a conveyor of FIG. 8.
Figure 14:
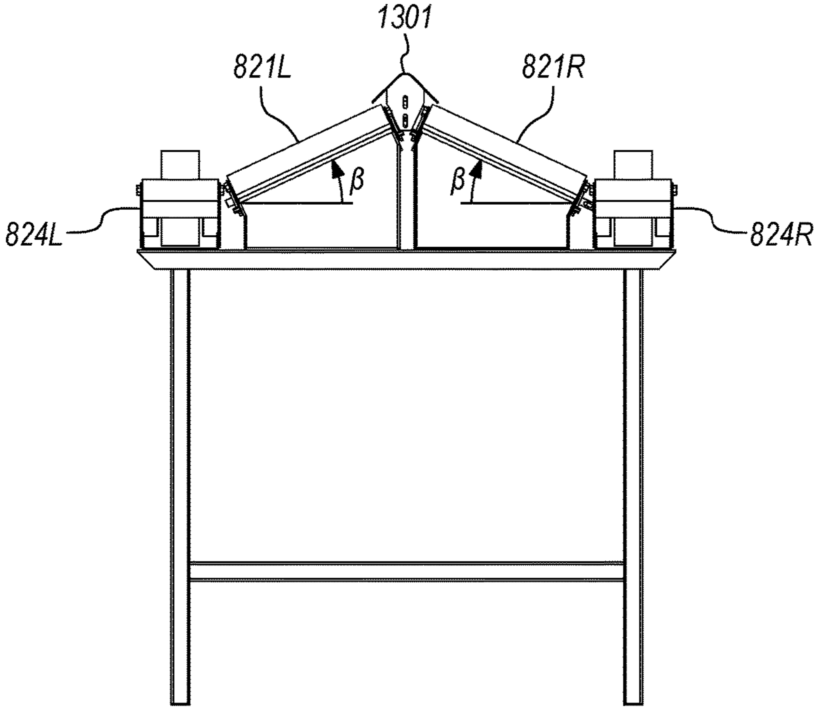

FIGS. 13 and 14 are a top view and an end view, respectively, a conveyor 821. Tail 822 includes a deflector 1301 which is positioned below head 813 of right conveyor 811 or head 816 of left conveyor 814, to ensure that material is directed to one of right conveyor 821R or left conveyor 821L. As shown in FIG. 14, right conveyor 821R and left conveyor 821L are both at an angle, β, to the horizon. This angle permits material falling onto right conveyor 821R to move towards right plant conveyor 824R and material falling onto left conveyor 821L to move towards left plant conveyor 824L. In certain embodiments, the angle, β, is from 10 degrees to 24 degrees.

Figure 15:
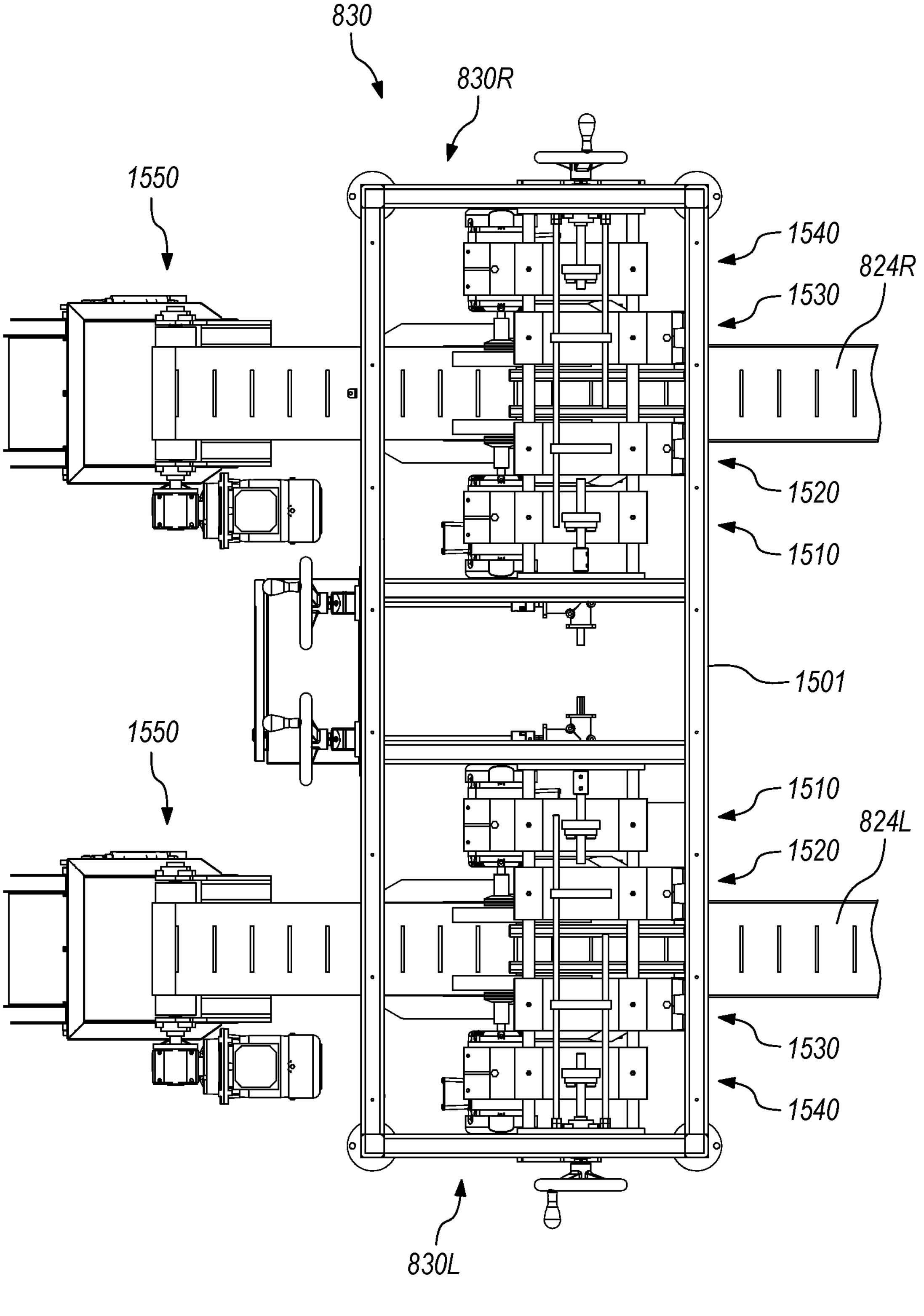
FIGS. 15, 16, and 17 are a top view, a rear view, and a perspective view of the trim stations of the trim station of FIG. 8.
Figure 16:
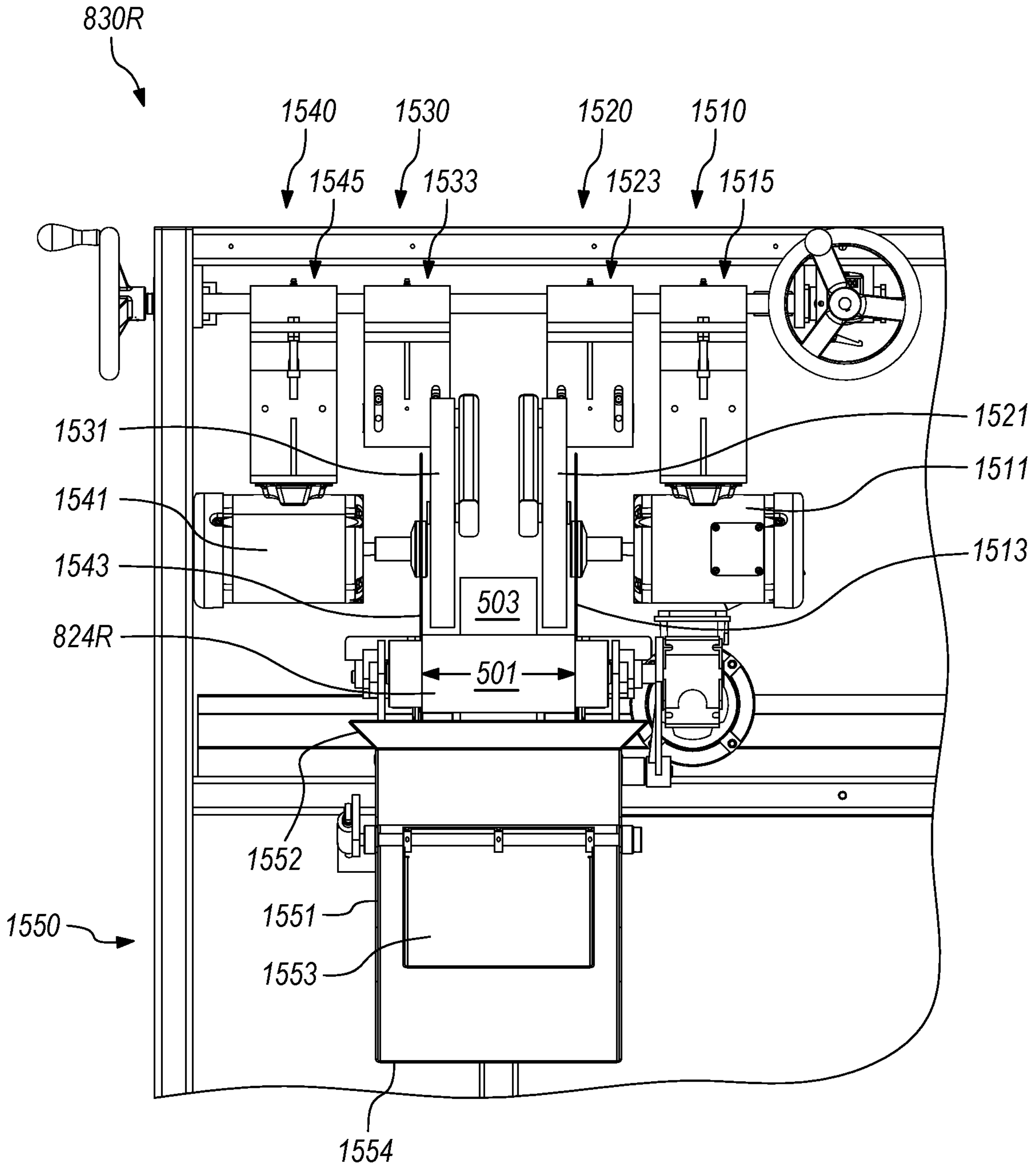
Figure 17:
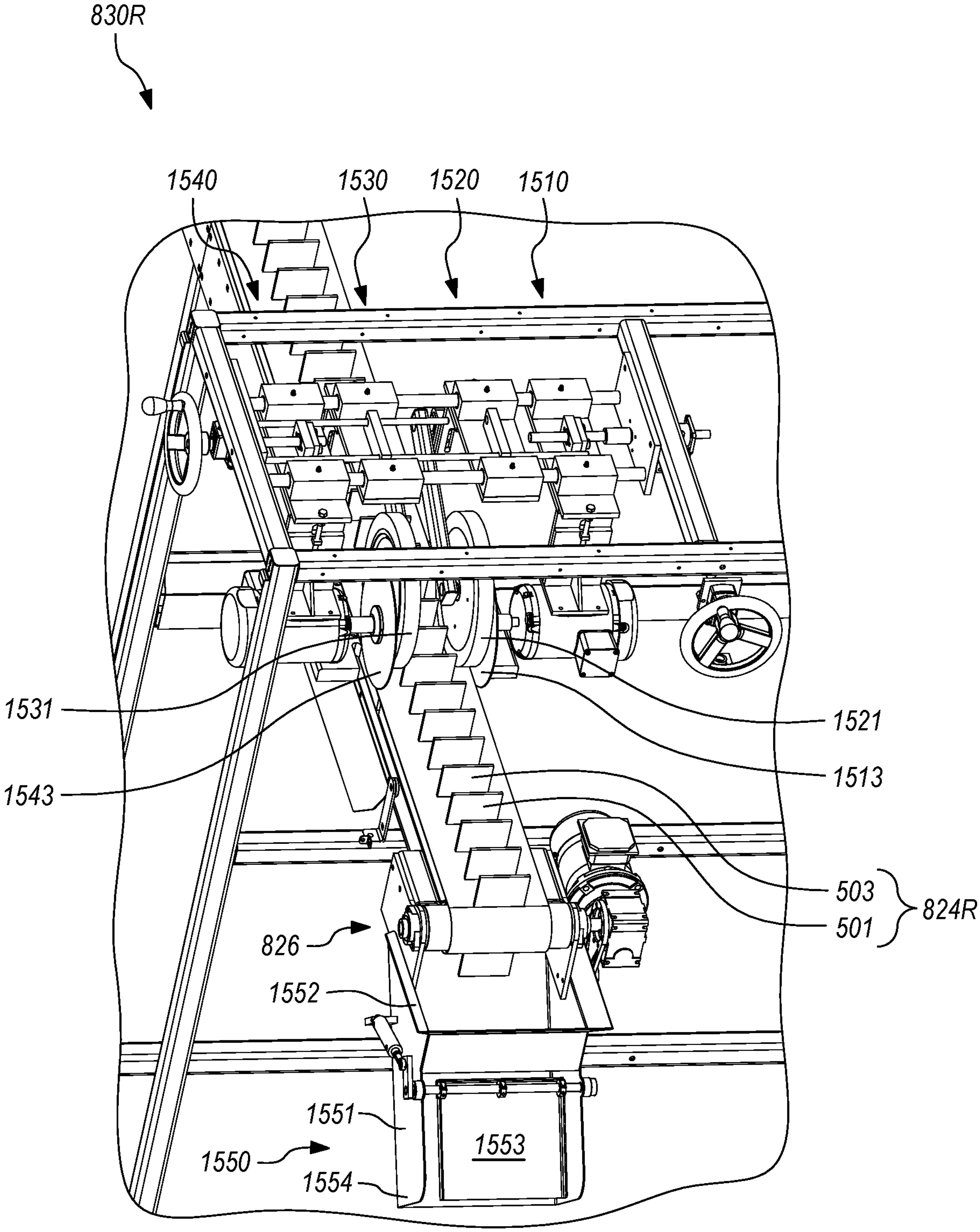

FIGS. 15, 16, and 17 are a top view, a rear view, and a perspective view of the trim stations of trim station 830. Trim station 830 is generally similar to trim station 149 except where explicitly stated.

Trim station 830 has a frame 1501 that supports a right trim station 830R and a left trim station 830L, where the left and right trim stations are generally similar and may be mirror images of each other. Thus, for example and without limitation, right trim station 830R includes a first trim system 1510, a second trim system 1540, a first press wheel system 1520, a second press wheel system 1530, and a chute 1550. First trim system 1510 includes a motor 1511 operable to rotate a first saw blade 1513 and a translation mechanism 1515 to transversely position first saw blade 1513 relative to and near one edge of conveyor belt 501 of right plant conveyor 824R. Second trim system 1540 includes a motor 1541 operable to rotate a second saw blade 1543 and a translation mechanism 1545 to transversely position second saw blade 1543 relative to and near the opposite edge of conveyor belt 501 of right plant conveyor 824R. First press wheel system 1520 includes a first press wheel 1521 and a mechanism 1523 to translate first press wheel 1521 to a region between an edge of conveyor belt 501 and cleats 503 of right plant conveyor 824R and to provide a force onto conveyor belt 501. Second press wheel system 1530 includes a second press wheel 1531 and a mechanism 1533 to translate second press wheel 1531 to a region between the opposite edge of conveyor belt 501 and cleats 503 of right plant conveyor 824R and to provide a force onto conveyor belt 501. Chute 1550 has a housing 1551 with a first opening 1552 near tail 825 of right plant conveyor 824R, a second opening 1554, and a flap 1553.

Second embodiment conveyor line 800 operates in a manner similar to conveyor line(s) 130. Material from air curtain apparatus 120 is deposited at input end 801 onto right conveyor 811 and left conveyor 814, and is transported to head 813 of right conveyor 811 and to head 816 of left conveyor 814. The material from right conveyor 811 then falls onto conveyor 821, with deflector 1301 directing the material onto either right conveyor 821R or left conveyor 821L. Workers on either side of right conveyor 811 select individual plants from conveyor 821 and transfer the plants onto the nearest one of right plant conveyor 824R or left plant conveyor 824L. Any material not removed from conveyor 821 by the workers falls from head 823 on to conveyor 842 and is transported towards second output end 806, where it is disposed of.

Right plant conveyor 824R continues through right trim station 830R, where first press wheel 1521 and second press wheel 1531 press plants on right plant conveyor 824R onto conveyor belt 501 and where first saw blade 1513 and second saw blade 1543 trim the plants at the edge of conveyor belt 501. Similarly, left plant conveyor 824L continues through left trim station 830L where first press wheel 1521 and second press wheel 1531 press plants on left plant conveyor 824L onto conveyor belt 501 and where first saw blade 1513 and second saw blade 1543 trim the plants at the edge of conveyor belt 501.

First press wheel 1521 and second press wheel 1531 are generally similar to press wheel press wheel 511, and the saw blades and motors of first trim system 1510 and second trim system 1540 are generally the same as the saw blade and motor illustrated in FIGS. 5 and 6.

Waste from the trimming of the plants falls to waste deflector 841 and onto conveyor 842 and eventually to second output end 806.

In certain embodiments, second embodiment conveyor line 800 includes counting device 700. In certain other embodiments, In certain other embodiments, second embodiment conveyor line 800 includes a counting device 700 including an LED and photodetector to count plants. In yet other embodiments, second embodiment conveyor line 800 does not include a counting device.

Trimmed plants from tail 825 of right plant conveyor 824R fall by entering first opening 1552, exiting second opening 1554, and then into waiting output bins 134. For continuous operation of the apparatus while changing output bins, flap 1553 may be operated to prevent plants from exiting second opening 1554 while a new output bins 134 is in place. In certain embodiments, a worker assists the loading of output bins 134 by alternating the orientation of plants, P, to tightly pack the output bins.

Trimmed plants from tail 825 of right plant conveyor 824R fall by entering chute 1550. The counting system will allow a number of plants to collect in the accumulator (from 1 plant to 100 plants), as selected by the operator, before it opens flap 1553 to allow the group of plants to drop into the packing box. This allows for groups of oriented plants to drop into the box and for the box loader operator to change out boxes during the continuous operation of the plant belt.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. Thus, for example, an apparatus may include a singulator, an air curtain and then, as in apparatus 100, a single second embodiment conveyor line 800 having the same width as the singulator and the air curtain. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

We claim:

1. An apparatus for sorting agricultural material, the apparatus comprising:

a first conveyor having a head, where the first conveyor is operates to transport agricultural material in a first direction towards the head;

a second conveyor having a tail aligned directly below the head of the first conveyor, where the tail is vertically separated from the head by a gap; and an air curtain apparatus having an air discharge, where the air curtain apparatus operates to generate an air curtain from air discharged towards the gap; wherein the air curtain is directed towards the gap in a second direction opposite to the first direction, such that when the first conveyor, the second conveyor, and the air curtain apparatus are operated, the air curtain deflects at least some of the agricultural material falling across the gap away from the second conveyor.

2. The apparatus of claim 1, where the first conveyor moves upwards at an angle, θ, relative to a horizon, and where the angle is sufficient to prevent rocks in the agricultural material from reaching the head of the first conveyor.

3. The apparatus of claim 2, where the angle is between 15 degrees and 25 degrees.

4. The apparatus of claim 1, where an average air curtain flow velocity at the air discharge is between 20 feet/min (6 m/min) and 200 feet/min (60 m/min).

5. The apparatus of claim 1, where the air curtain at the air discharge is directed at an angle of between −20° and +20° relative to a horizon.

6. The apparatus of claim 1, where an initial height of the air curtain at the air discharge is between 1 inch (25 mm) and 5 inches (125 mm).

7. The apparatus of claim 1, where a horizontal distance between the air discharge and the head of the first conveyor is between 3 inches (75 mm) and 20 inches (0.5 m).

8. The apparatus of claim 1, where a vertical distance between the air discharge and the head of the first conveyor is between +15 inches (+375 mm) and −15 inches (−375 mm).

9. A method for separating agricultural material, the method comprising:

transporting the agricultural material in a first direction along a first conveyor to a head of the first conveyor, where a second conveyor having a tail aligned directly below the first conveyor, and where the tail is vertically separated from the head by a gap;

directing an air curtain from an air discharge towards agricultural material falling across the gap, such that the air curtain deflects at least some of the agricultural material falling across the gap away from the second conveyor; wherein the air curtain is directed towards the gap in a second direction opposite the first direction; and collecting undeflected agricultural material on the second conveyor.

10. The method of claim 9, where the first conveyor forms an angle to a horizon, and where the angle is sufficient to prevent rocks in the agricultural material from reaching the head of the first conveyor.

11. The method of claim 10, where the angle is between 15 degrees and 25 degrees.

12. The method of claim 9, where an average air curtain flow velocity at the air discharge is between 20 ft/min and 200 ft/min.

13. The method of claim 9, where the air curtain at the air discharge is directed at an angle of between −20° and +20° relative to a horizon.

14. The method of claim 9, where an initial height of the air curtain at the air discharge is between 1 inch (25 mm) and 5 inches (125 mm).

15. The method of claim 9, where a horizontal distance between the air discharge and the head of the first conveyor is between 3 inches (75 mm) and 20 inches (0.5 m).

16. The method of claim 9, where a vertical distance between the air discharge and the head of the first conveyor is between +15 inches (+375 mm) and −15 inches (−375 mm).

* * * * *